US011490366B2

(12) United States Patent
Sethi et al.

(10) Patent No.: US 11,490,366 B2
(45) Date of Patent: Nov. 1, 2022

(54) NETWORK FUNCTION VIRTUALISATION

(71) Applicant: Hewlett Packard Enterprise Development LP, Houston, TX (US)

(72) Inventors: Aseem Sethi, Bangalore (IN); Mark Andrew Denny, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 350 days.

(21) Appl. No.: 16/405,672

(22) Filed: May 7, 2019

(65) Prior Publication Data
US 2020/0359359 A1 Nov. 12, 2020

(51) Int. Cl.
*H04W 72/04* (2009.01)
*H04L 12/46* (2006.01)

(52) U.S. Cl.
CPC ......... *H04W 72/04* (2013.01); *H04L 12/4641* (2013.01)

(58) Field of Classification Search
CPC ............. H04L 12/1822; H04L 12/1827; H04L 12/1886; H04L 29/06312; H04L 29/08225; H04L 47/2491; H04L 63/104; H04L 65/1073; H04L 67/1004; H04L 67/148; H04W 4/025; H04W 4/08; H04W 60/00
See application file for complete search history.

(56) References Cited

U.S. PATENT DOCUMENTS

| 9,378,043 | B1 | 6/2016 | Zhang et al. |
| 2014/0317261 | A1 | 10/2014 | Shatzkamer et al. |
| 2020/0177683 | A1* | 6/2020 | Zhao ................... H04L 12/1827 |

FOREIGN PATENT DOCUMENTS

| EP | 2892183 A1 | 7/2015 |
| WO | WO-2016180464 A1 | 11/2016 |
| WO | WO-2017008839 A1 | 1/2017 |

OTHER PUBLICATIONS

ETSI Group Specification, "Network Functions Virtualisation (NFV); NFV Performance & Portability Best Practises", NFV-PER 001 V1.1.1 (Jun. 2014), pp. 1-65.
ETSI Group Specification, "Network Functions Virtualisation (NFV); Service Quality Metrics", NFV-INF 010 V1.1.1 (Dec. 2014), pp. 1-27.
Juniper Networks_architecture for Technology Transformation, 2017, pp. 1-11, Retrieved from the Internet on Sep. 28, 2018 from URL: <juniper.net/assets/jp/jp/local/pdf/whitepapers/2000633-en.pdf>.
Understand Your Chains: Towards Performance Profile-based Network Service Management, Mar. 23, 2017, pp. 1-7 Retrieved from the Internet on Sep. 28, 2018 from URL: <arxiv.org/pdf/1703.08206.pdf>.

* cited by examiner

*Primary Examiner* — Kodzovi Acolatse
*Assistant Examiner* — Mon Cheri S Davenport

(57) ABSTRACT

Example implementations relate to a data processing method for monitoring at least one performance metric associated with a characteristic of a virtual network function; the method comprising instantiating the virtual network function, monitoring said at least one performance metric associated with the characteristic of the virtual network function; and adapting allocated resources supporting the virtual network function according to said monitoring.

20 Claims, 9 Drawing Sheets

100

300D

NETWORK FUNCTION VIRTUALISATION

In non-virtualised networks, network functions (NFs) are implemented as a combination of vendor specific software and hardware, which can be referred to as network nodes or network elements. The network functions can be connected or chained in a certain manner to achieve a desired overall functionality or service. Non-virtualised networks are defined by statically combining network functions in a way that can be expressed as a NF forwarding graph or NF set construct. In contrast, Network Function Virtualisation (NFV) enables dynamic methods rather than just static ones to be used in constructing and managing the network function graphs or sets. It will be appreciated that the term virtualisation means that a network function and part of the infrastructure are implemented in software.

Network function virtualization provides a number of alternative ways for provisioning services, which comprise, for example, decoupling software from hardware, which allows the evolution of each to progress independently of one another, flexible network function deployment, which facilitates allocation and reallocation of infrastructure resources to perform different functions at different times, and dynamic operation that follows from decomposing the network functions into instantiable software components that provide greater flexibility to scale virtual network function performance with selected levels of granularity.

Given the dynamic nature of a network using network function virtualisation, it is increasingly challenging to derive performance metrics associated with a network, a NF graph or set construction or a virtualized network function, especially multiple virtualized network functions.

Example implementations will now be described with reference to the accompanying drawings in which.

Figure 1:
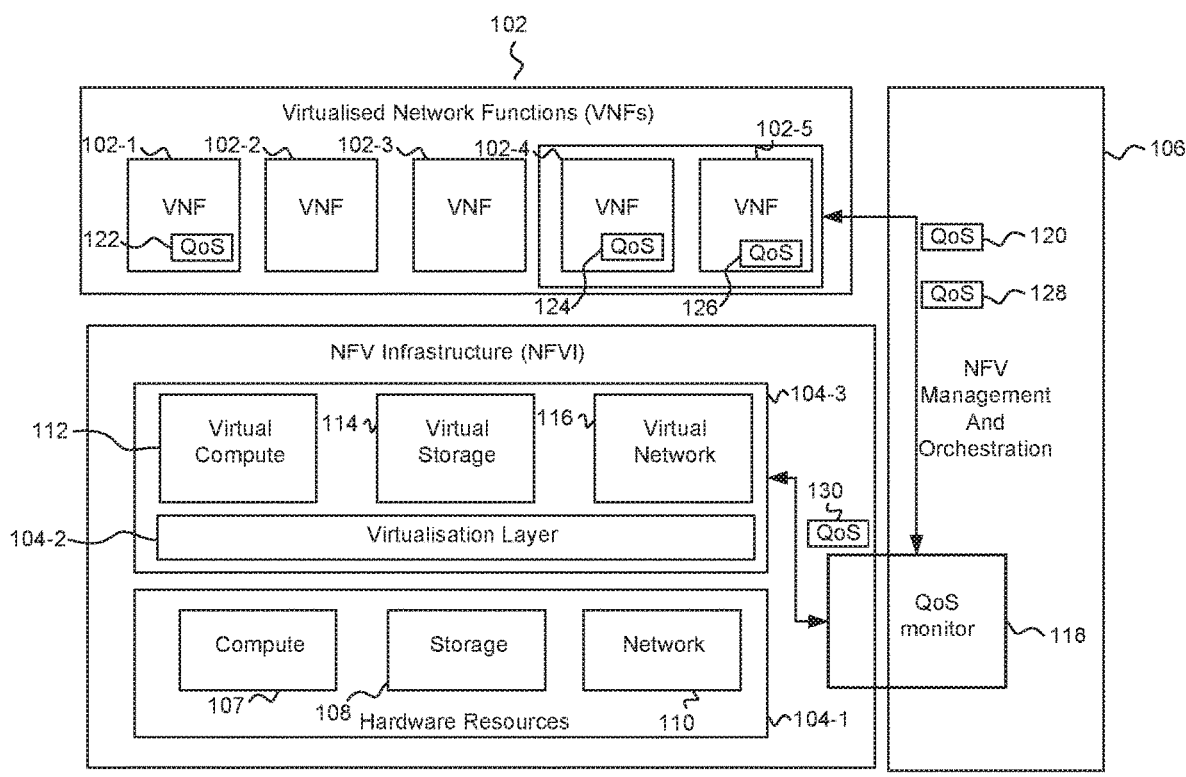
FIG. 1 shows a Network Function Virtualisation system according to example implementations.

Referring to FIG. 1, there is shown a schematic view of Network Function Virtualisation (NFV) framework 100 according to an example implementation. The framework 100 comprises three working domains that are one or more than one Virtualised Network Function (VNF) 102, a Network Function Virtualisation Infrastructure (NFVI) 104 and a Network Function Virtualisation Management and Orchestration (MANO) entity 106.

The one or more than one VNF 102 provides a software implementation of a network function that is capable of running over the NFVI 104. In the illustrated implementation, a number of VNFs 102-1 to 102-5 are shown.

The NFVI 104 provides the physical resources for supporting or executing the one or more than one VNFs 102-1 to 102-5. The NFVI 104 comprises hardware resources 104-1, virtualisation resources 104-2 and virtual resources 104-3. The hardware resources 104-1 can comprise computer resources 107, storage resources 108 and network resources 110. The compute resources 107 can comprise one or more than one processor (not shown). The storage resources 108 can comprise any form of volatile and/or non-volatile storage. The network resources 110 can comprise network communication resources for communicating with one or more than one other network node or network element. The virtualisation resources 104-2 can comprise, for example, a hypervisor that is arranged to present the hardware resources 104-1 as the above virtual resources 104-3. The virtual resources 104-3 can comprise virtual compute resources 112, virtual storage resources 114 and virtual network resources 116. The virtual compute resources 112 can comprise one or more than one virtual processor (not shown). The virtual storage resources 114 can comprise or present any form of virtual volatile and/or virtual non-volatile storage. The virtual network resources 110 can comprise virtual network communication resources for communicating with one or more than one other network node or network element.

The MANO entity 106 facilitates orchestration and life cycle management of at least one, or both, of the physical and software resources that support the infrastructure virtualisation.

Also shown is a Quality of Service (QoS) monitor 118. The QoS monitor 118 can be located within, or form part of, the MANO 106 or the NFVI 104, or be a standalone entity, or be, or form part of, some other network entity. The QoS monitor 118 is arranged to monitor the quality of service provided by one or more than one VNF 102-1 to 102-5, taken jointly and severally in any and all permutations. The QoS monitor 118 can comprise at least one, or both, of software and hardware configured to monitor the quality of service provided by the one or more than one VNF 102-1 to 102-5. The VNFs 102-1 to 102-5 can be grouped to form a Virtual Network Function Forwarding Graph (VNF-FG) or a Virtual Network Function Set. A VNF-FG refers to a number of VNFs having a connectivity that matters or is specified whereas a VNF Set refers to a number of VNFs having a connectivity that does not matter or is not specified.

A Virtual Network Forwarding Graph or Virtual Network Function Set can be used to provide a service chain. A service chain is a linked group of Virtual Network Functions. For example, a service chain might comprise a plurality of Virtual Network Functions such as, for example, a Firewall, an Intrusion Detection System, Decryption etc., or a Wifi Router, Wireless Checking and Deep Packet Inspection.

Quality of Service data 120 can be forwarded from the one or more than one VNFs 102-1 to 102-5 to the QoS monitor 118. The QoS data 120 can be sent by the one or more than one of the VNFs 102-1 to 102-5 individually or collectively. For example, a given VNF such as the first VNF 102-1 may send associated QoS data 122 associated with the performance of the first VNF 102-1 to the QoS monitor 118. Furthermore, two or more VNFs such as, for example, the fourth VNF 102-4 and the fifth VNF 102-5 can send respective QoS data 124 and 126 as collective QoS data 128. The collective QoS data 128 can represent the mere collation of the respective QoS 124 and 126, or can represent QoS data derived from the respective QoS data 124 and 126.

Alternatively, or additionally, QoS data 130 can be forwarded to the QoS monitor 118 from the one or more than one virtual resources 112, 114, 118 or the virtualisation layer 104-2.

The QoS monitor 118, or some other entity, can be responsive to the received QoS data. For example, example implementations can be realised in which the resources allocated to one or more than one VNF are varied in response to the QoS data. The variation may comprise allocating more resources or fewer to one VNF, either alone or in conjunction with allocating more or fewer resources to a further VNF. The allocated resources can be increased, for example, if the measured QoS data indicates that a QoS associated with a respective VNF is unacceptable such as, for example, if the determined QoS is at, or below, a predetermined lower QoS threshold. Alternatively, or additionally, allocated resources can be decreased, for example, if the measured QoS data indicates that a QoS associated with a respective VNF is unacceptable such as, for example, if the measured QoS is at, or above, a predetermined upper QoS threshold. Having made a determination regarding resources associated with one or more than one VNF, the QoS monitor 118 can instruct the virtualisation layer, such as, for example, a hypervisor associated with such a layer, to give effect to any such determination.

Figure 2:
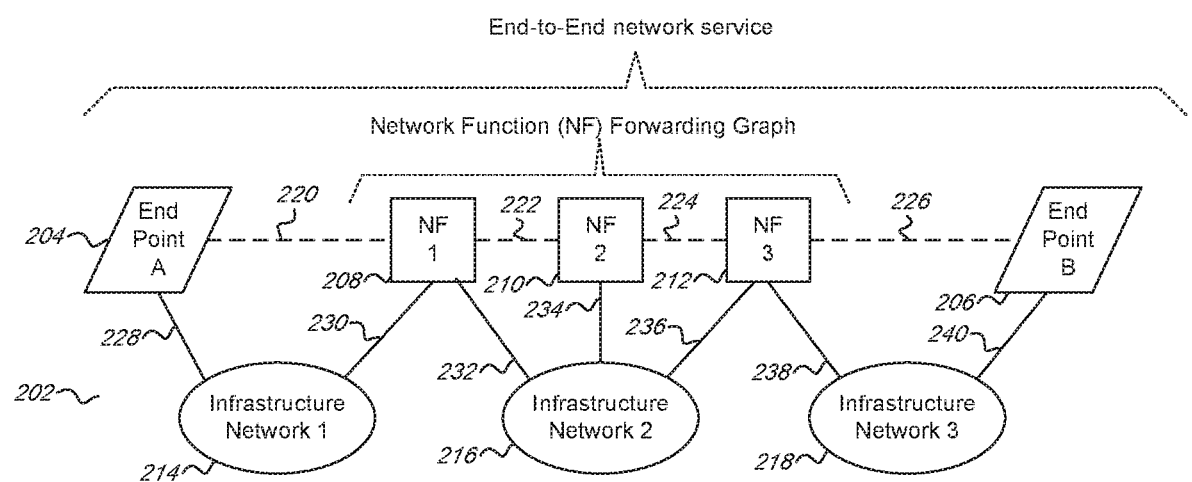
FIG. 2 illustrates a graph of end-to-end network services according to example implementations.

Referring to FIG. 2, there is shown a view 200 of an end-to-end network service 202 that can be realised using one or more than one of the VNFs 102-1 to 102-5. The end-to-end network service 202 is expressed in FIG. 2 as a VNF Forwarding Graph (VNF-FG). The end-to-end network service can be any network service such as, for example, one or more than one of mobile voice/data, Internet access, a virtual private network etc. The end-to-end network service 202 is provided between at least a pair of end points 204 and 206. The end-to-end network service 202 illustrated comprises three virtual network functions 208 to 212. The end points 204 and 206 as well as the VNFs 208 to 212, are supported, or interconnected, using one or more than one NFVI. In the example depicted in FIG. 2, first 214, second 216 and third 218 NFVI are provided. However, example implementations can be realised in which the NFVI used to support the VNFs 208 to 212 is a single instance of a NFVI such as the NFVI 104.

It will be appreciated that the VNFs 208 to 212 and end points 204 and 206 are represented as nodes and correspond to devices, applications, physical and virtual software, physical and virtual hardware. The nodes can be connected by logical links 220 to 226. The logical links can be at least one or more of unidirectional, bidirectional, multicast or broadcast taken jointly and severally in any and all permutations. The logical connections are represented by dashed lines. The logical links 220 to 226 can be realised using one or more than one physical connections such as, for example the physical connections 228 to 240 depicted.

Referring to FIG. 3, there is shown a view 300 of an end-to-end network service 302. The end-to-end network service 302 is established between, or comprises, first 304 and second 306 end points. The first 304 and second 306 end points are virtually coupled, that is, are logically connected or linked, via a plurality of VNFs 308 to 316. The VNFs 308 to 316 can correspond to the above described VNFs 102-1 to 102-5. It can be seen that the VNFs 308 to 316 form a VNF-FG 318. A number of the VNFs 308 to 316 can be arranged for form a nested VNF-FG 320 such as VNFs 310 to 314.

The VNFs 308 to 316 are in communication with, or are supported by, a virtualisation layer 322. The virtualisation layer 322 can be an example of the above described virtualisation layer 104-2. As described above with reference to FIG. 1, the virtualisation layer 322 is supported, or provided, using respective physical resources in the form hardware resources 324. The hardware resources 324 can be an example of the above described hardware resources 104-1. The hardware resources can be coupled using respective physical links 326 to 338. The end points 304 and 306 and the VNFs 308 to 316 are coupled via respective logical links 340 to 352. The VNFs 308 to 316 are in communication with, or coupled to, the virtualisation layer 322 via respective logical links 354 to 364. Logical links 365 to 369 can also be established between the hardware resources 324 and the VNFs 308 to 316.

One or more than one of the VNFs can have associated QoS data. In the example depicted, the VNFs 308 to 316 each have respective QoS data 370 to 378. The QoS data 370A to 378 can be sent to the virtualisation layer 322 for subsequent forwarding to, or processing by, a QoS monitor 380. The QoS monitor 380 can be an example of the above described QoS monitor 118 and can take corresponding actions and make corresponding determinations regarding resources allocated to the one or more than one VNF. The QoS data 370 to 378 can be selectively sent to the virtualisation layer 322 individually, or grouped. For example, implementations can be realised in which the nested VNF-FG 320 forwards, at least one, or both, of the individual QoS data 372 to 376 of the VNFs 310 to 314, or a single QoS data (not shown) that is derived from one or more than one of the QoS data 372 to 376 taken jointly and severally in any and all permutations.

Figure 3A:
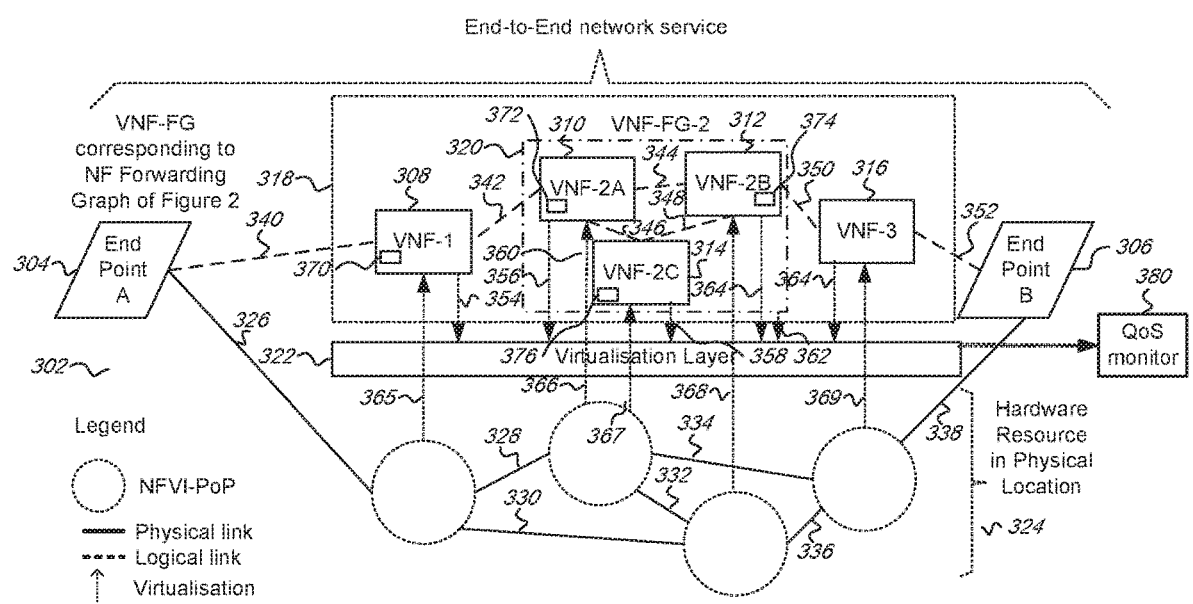
FIG. 3A depicts the graph of FIG. 2 with Virtual Network Functions and nested forwarding graphs according to example implementations.
Figure 3B:
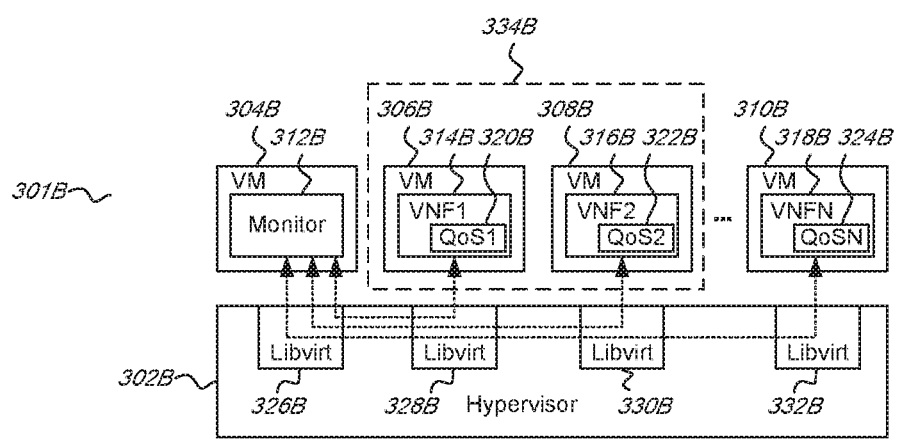
FIG. 3B shows monitoring a number of Virtual Network functions according to example implementations.

Referring to FIG. 3B, there is shown a view 300B of a system 301B for performance monitoring according to example implementations. The system 301B can be an example implementation of the foregoing systems. The system 301B comprises a hypervisor 302B. The hypervisor 302B can be an example implementation of the above described virtualisation layer 104-2. The hypervisor 302B is arranged to support one or more than one virtual machine. In the example shown, a number of virtual machines 304B to 310B are supported by the hypervisor 302B. The example implementation depicts comprises N virtual machines 304B to 310B, where N is ≥1. One or more than one virtual machine of the N virtual machines 304B to 310B can support one or more than one respective Virtual Network Function. In the example depicted, each of virtual machines 306B to 310B support a respective Virtual Network Function 314B to 318B. One or more than one Virtual Network Function 314B to 318B can have respective performance data or quality of service data. In the example implementation shown, three of the Virtual Network Functions 314B to 318B have respective performance data or quality of service data 320B to 324B.

One of the virtual machines 304B comprises an agent or monitor 312B. The agent or monitor 312B is arranged to assess the performance of one or more than one of the Virtual Network Functions 314B to 318B. The monitor 312B is able to collate or otherwise access data relating to one or more of the Virtual Network Functions 314B to 318B via the hypervisor 302B. The hypervisor 302B provides an interface via which such data relating to one or more of the Virtual Network Functions 314B to 318B can be accessed. Example implementations can be realised in which the interface is a Libvirt interface. In the example implementation depicted, a number such interfaces 326B to 332B are provided. One or more than one such interface can be provided per virtual machine 304B to 310B. The agent or monitor 312B can request the performance or quality of service data 320B to 324B of any of the Virtual Network Functions 314B to 318B. For example, the agent or monitor 312B can request performance data or quality of service data 320B associated with the first Virtual Network Function 314B. The monitor or agent 312B can request any of performance data or quality of service data 320B to 324B taken jointly and severally in any and all permutations.

The agent or monitor 312B, having obtained such performance data or quality of service data 320B to 324B, can assess the performance of, or quality of service provided by, one or more than one of the Virtual Network Functions 314B to 318B. Assessing the performance of, or quality of service provided by, one or more than one of the Virtual Network Functions 314B to 318B can be performed using the performance data, or quality of service data, 320B to 324B taken jointly and severally in any and all permutations.

For example, the agent or monitor 312B may request the hypervisor 302B to provide performance data, or quality of service data, associated with the Virtual Network Function 314B hosted by the respective virtual machine 306B. The agent or monitor 312B can assess the performance data, or quality of service data, 320B against a criterion or criteria to determine whether or not the Virtual Network Function 314B is performing acceptably. If the agent or monitor 312B determines that the Virtual Network Function 314B is performing acceptably, the agent or monitor 312B can resume monitoring the Virtual Network Function 314B, one or more than one of the other Virtual Network Functions 316B to 318B or perform some other task. If the agent or monitor 312B determines that the Virtual Network Function is performing unacceptably, the agent or monitor 312B can instruct the hypervisor 302B, via the interface 326B, to vary the resources available to the Virtual Network Function 314B. The resources allocated by the hypervisor 302B, or requested to be varied by the agent or monitor 312B, will be resources associated with the performance data, or quality of service data, 320A being deemed unacceptable.

Example implementations can be realised in which two or more of the Virtual Network Functions 314B to 318B cooperate, or are otherwise operated together, such as, for example, in parallel or sequentially. As indicated above, multiple Virtual Network Functions cooperating, or otherwise operating together, form a Virtual Network Function Forwarding Graph 334B. The Virtual Network Function Forwarding Graph 334B can have an associated performance criterion or associated performance criteria. Suitably, the agent or monitor 312B can request performance data, or quality of service data, from two or more Virtual Network Functions constituting the Virtual Network Function Forwarding Graph 3334B and assess the performance data, or quality of service data, against a criterion or criteria to determine whether or not the Virtual Network Function Forwarding Graph 334B is performing acceptably. If the agent or monitor 312B determines that the Virtual Network Function Forwarding Graph 334B is performing acceptably, the agent or monitor 312B can resume monitoring the Virtual Network Function 314B, one or more than one of the other Virtual Network Functions 316B to 318B or perform some other task. If the agent or monitor 312B determines that the Virtual Network Function Forwarding Graph 334B is performing unacceptably, the agent or monitor 312B can instruct the hypervisor 302B, via the interface 326B, to vary the resources available to the Virtual Network Function Forwarding Graph 334B. The resources allocated by the hypervisor 302B, or requested to be varied by the agent or monitor 312B, will be resources associated with the performance data, or quality of service data, of the Virtual Network Function Forwarding Graph 334B being unacceptable.

In the example depicted, the Virtual Network Function Forwarding Graph 334B comprises two Virtual Network Functions 314B and 316B. The performance data, or quality of service data, 320B and 322B of one, or both, of the Virtual Network Functions 314B and 316B can be used jointly or severally in determining whether or not the Virtual Network Function Forwarding Graph 334B is performing acceptably or unacceptably as measured against a respective criterion or against respective criteria.

Although the example implementation depicted shows the Virtual Network Function Forwarding Graph 334B as comprising two Virtual Network Functions 314B and 316B, example implementations can be realised in which the Virtual Network Function Forwarding Graph 3334B comprises some other number of Virtual Network Functions of any one or more than one available Virtual Network Function taken jointly and severally in any and all permutations. Furthermore, although the Virtual Network Function Forwarding Graph 334B has been illustrated as comprising Virtual Network Functions 314B and 316B supported by respective virtual machines 306B and 308B, example implementations can be realised in which the Virtual Network Function Forwarding Graph 334B comprises two or more Virtual Network Functions supported by at least one or more than one virtual machine. Therefore, example implementations can be realised in which the Virtual Network Function Forwarding Graph 334B comprises a plurality of Virtual Network Functions supported by the same virtual machine. Example implementations can be realised in which the a Virtual Network Function Forwarding Graph comprises Virtual Network Functions that are supported by one or more than one virtual machine.

Figure 3C:
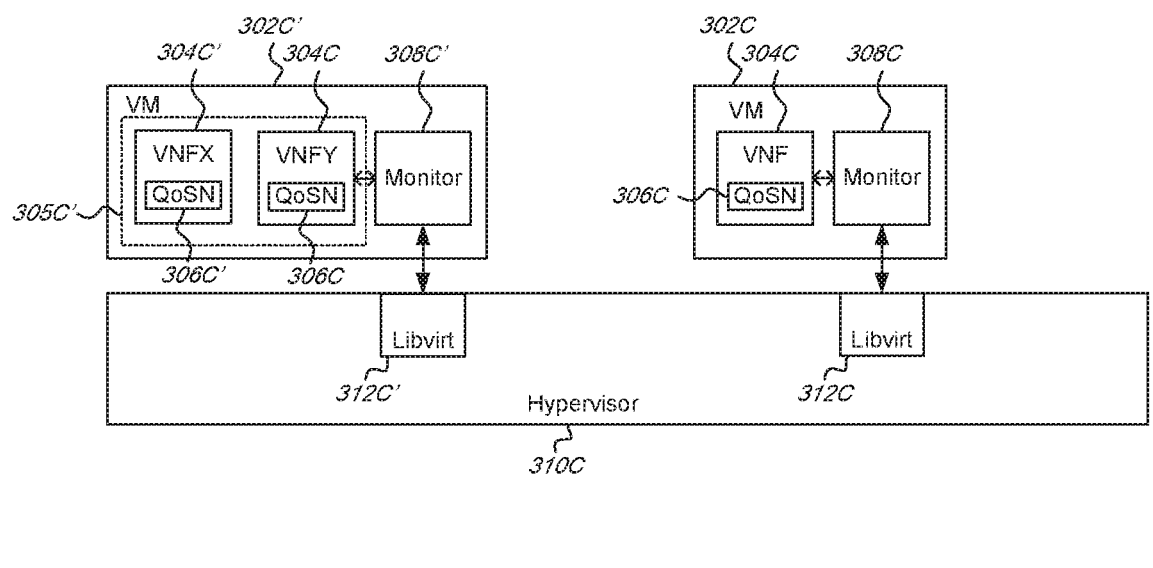
FIG. 3C illustrates monitoring a number of Virtual Network functions according to example implementations.

Referring to FIG. 3C, there is shown a view 300C of an alternative, or additional, example implementation of a virtual machine 302C hosting a respective Virtual Network Function 304C having associated performance data, or quality of service data, 306C. The virtual machine 302C also comprises an agent or monitor 308C. The agent or monitor 308C is operable to monitor the performance data, or quality of service data, 306C to determine whether or not it is acceptable. If the performance data, or quality of service data, 306C is acceptable, the agent or monitor 308C continues monitoring. If the performance data, or quality of service data, 306C is unacceptable, the agent or monitor 308C can request further resources from the hypervisor 310C via a respective hypervisor interface 312C. If the agent or monitor 308C determines that the Virtual Network Function 304C is performing unacceptably, the agent or monitor 308C can instruct the hypervisor 310C, via a hypervisor interface 312C, to vary the resources available to the Virtual Network Function 304C. The resources allocated by the hypervisor 310C, or requested to be varied by the agent or monitor 308C, will be resources associated with the performance data, or quality of service data, that was deemed to be unacceptable.

Referring still to FIG. 3C, there is shown a still further an alternative, or additional, example implementation of a virtual machine 302C'. The still further virtual machine 302C' hosts a plurality of respective Virtual Network Functions, such as for example, the two Virtual Network Functions 304C and 304C' shown. One or more of the plurality of Virtual Network Functions can form a respective Virtual Network Function Forwarding Graph 305C'. One or more than one of the Virtual Network Functions 304C and 304C' has respective performance data, or quality of service data, 306C. In the example show, each of the plurality of Virtual Network Functions 304C and 304C' has respective data, or quality of service data, 306C and 306C'.

The virtual machine 302C' also comprises an agent or monitor 308C'. The agent or monitor 308C' is operable to monitor the performance data, or quality of service data, 306C and 306C' to determine whether or not it is acceptable. If the performance data, or quality of service data, 306C and 306C' is acceptable, the agent or monitor 308C' continues monitoring. If the performance data, or quality of service data, 306C and 306C' is unacceptable, the agent or monitor 308C' can request further resources from the hypervisor 310C via a respective hypervisor interface 312C'. If the agent or monitor 308C' determines that the Virtual Network Function Forwarding Graph 305 is performing unacceptably, the agent or monitor 308C' can instruct the hypervisor 310C, via a hypervisor interface 312C', to vary the resources available to the Virtual Network Function Forwarding Graph 305C'. The resources allocated by the hypervisor 310C, or requested to be varied by the agent or monitor 308C', will be resources associated with the performance data, or quality of service data, that was deemed to be unacceptable.

At least one, or both, of the virtual machines 302C and 302C' can be an implementation of any one or more than one, or all, of the above described virtual machines 306B to 310B taken jointly and severally in any and all permutations.

Figure 3D:
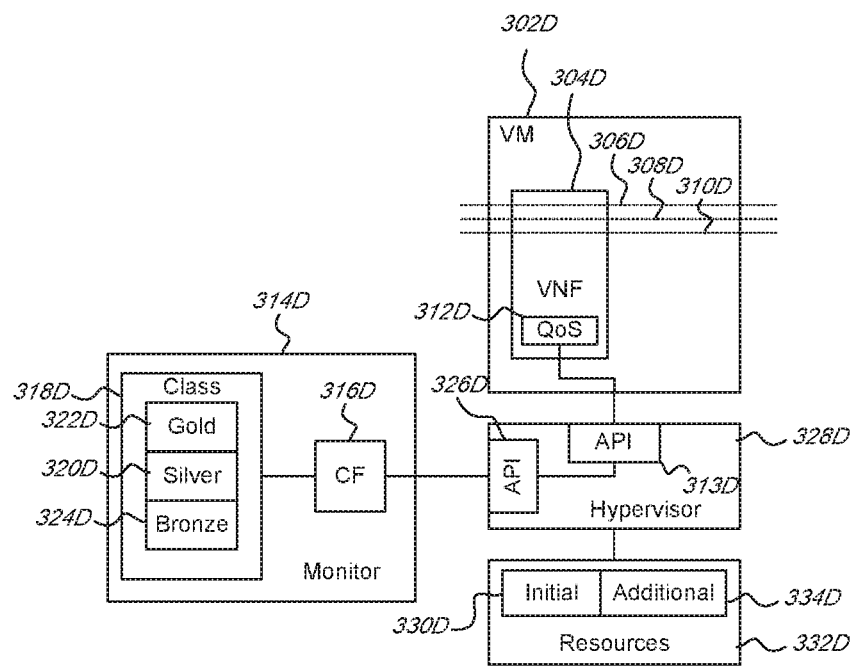
FIG. 3D depicts performance monitoring relative to classes of service according to example implementations.

Example implementations can be realised in which at least one, or both, of the performance data, or quality of service data, 320B to 324B is associated with one or more than one flow. The flow can comprise one or more than one packet in transit. The one or more than one packet can comprise at least one data unit or element of a protocol layer such as for example, a TCP/IP packet or a UDP packet. FIG. 3D, shows a view 300D of a virtual machine 302D hosting at least one Virtual Network Function 304D that supports a set of one or more than one flow. In the example depicted, the set of one or more than one flow comprises three flows 306D to 310D. The flows 306D to 310D have associated performance data, or quality of service data. The flows 306D to 310D can have respective performance data, or quality of service data, or common or combined performance data, or quality of service data, 312D. The virtual machine 302D can be an example implementation of any virtual machine described herein.

One or more than one of the flows 306D to 310D can originate from, or be to, an end point, or be from, or to, another Virtual Network Function such as, for example, forming part of a service chain.

The performance data, or quality of service data, in any and all implementations described herein can comprise data relating to flow performance, network performance or any other performance metric. For example, the performance data can relates to at least one or more than one of latency, jitter, bandwidth, throughput, packet loss, error rate, bandwidth-delay-product, packet loss etc. Alternatively, or additionally, the performance metrics can relate to at least one, or both, of hardware or software resources. Such hardware and software resources can comprise at least one or more than one of memory allocations, buffer size, CPU time, number of calls of a predetermined type such as, for example, number of kernel calls, taken jointly or severally in any and all permutations. Example implementations can provide performance or quality of service data relating to a predetermined protocol or an aspect of a predetermined protocol layer. The predetermined protocol can comprise at least one or more than one of an Internet layer protocol such as, for example, IP, IPv4, IPv6, ICMP, ICMPv6 etc., a link layer protocol such as, for example, TCP, UDP, DCCP, SCTP, RSVP, etc., or the like.

Therefore, example implementations can be realised in which the performance data, or quality of service data, relates to at least one, or both of a protocol or an operating system.

If the performance data 312D shows, for example, that the latency of one or more than one flow of the flows 306D to 310D is unacceptable due to, for example, a coding or decoding delay, a monitor such as, for example, monitor 118, 312B, 308C, 308C' or some other monitor can request the hypervisor to make additional resources available to improve the coding or decoding speed with a view to reducing the delay.

Example implementations can be realised in which the performance data, or quality of service data, 312D is assessed by a monitor 314D. The performance data 312D is supplied to the monitor 314D via an interface 313D. The performance data 312D can be accessed in response to an enquiry or request issued by the monitor 314D or some other entity, or in response to an agent (not shown) of, or associated with, the Virtual Network Function 304D, pushing or otherwise publishing the performance data 312D to the monitor 314D.

The monitor 314D is an example implementation of any of the monitors or agents described herein. The monitor 314D can comprise a comparator 316D. The comparator 316D is arranged to compare the performance data 312D with a set of data 318D. Example implementations can be realised in which the set of data 318D represents a plurality of classes of service associated with one or more than one of the flows 306D to 310D taken jointly and severally in any and all permutations. In the example implementation depicted, the plurality of classes of service comprise an intermediate performance level 320D, a higher performance level 322D and a lower performance level 324D. Although the example implementation depicted comprises three performance levels, examples can be realised that comprise two or more than two performance levels. The set of data 318D can represent, for example, varying levels of any metric associated with a flow described herein taken jointly or severally in any and all permutations. For example, the set of data 318D can represent various levels of latency, jitter, bandwidth, throughput, packet loss, error rate, bandwidth-delay-product, packet loss taken jointly and severally in any and all permutations. Alternatively, or additionally, the set of data 318D can be associated with performance metrics relating to at least one, or both, of hardware or software resources. Such hardware and software resources can comprise at least one or more than one of memory allocations, buffer size, CPU time, number of calls of a predetermined type such as, for example, number of kernel calls taken jointly or severally in any and all permutations.

Having determined the current performance level into which the performance data 312D fits, the comparator 316D interacts, via an interface 326D of the hypervisor 328D, to vary the initial resources 330D of at least one, or both, of hardware and software 332D, to add additional resources 334D to the initial resources 330D to improve the performance data 312D associated with the one or more than one flow 306D to 310D.

Alternatively, having compared the current performance data 312D with the set of data 318D, the comparator 316D interacts, via an interface 326D of the hypervisor 328D, to vary the initial resources 330D of at least one, or both, of hardware and software 332D, to remove resources 334D from the initial resources 330D to reduce the performance data 312D associated with the one or more than one flow 306D to 310D. Therefore, example implementations are provided in which the comparator 316D interacts, via an interface 326D of the hypervisor 328D, to vary the initial resources 330D of at least one, or both, of hardware and software 332D, assigned to support at least one, or both, of the virtual machine 302D or the at least one Virtual Network Function 304D running on the virtual machine 302D.

Figure 4:
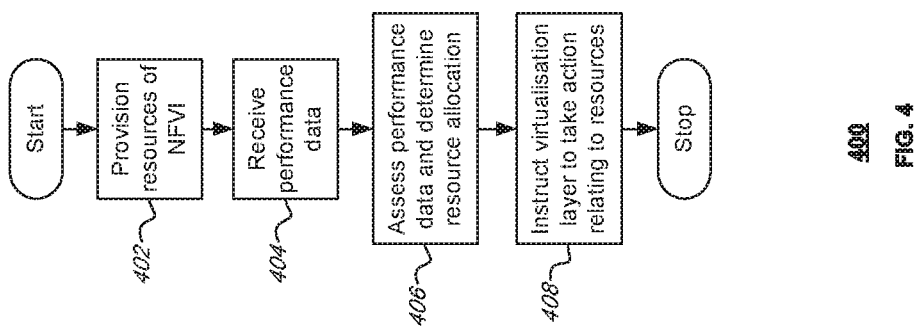
FIG. 4 shows a number of data structures for realising quality or class of service monitoring according to example implementations.

Referring to FIG. 4, there is shown a flowchart 400 according to an example implementation. At 402, the MANO 106 provisions the resources of the NFVI 104 to provide one or more than one of the VNFs 102-1 to 102-5, VNFs 308 to 316 or any other VNF, taken jointly and severally, described herein. The one or more than one VNF provides, at 404, performance data, or quality of service data, such as, for example, QoS data, to the QoS monitor 118. At 406, the QoS monitor 118 receives the performance data, or the quality of service data, and makes a determination regarding the resources associated with the one or more than one VNF and instructs, at 408, the virtualisation layer 104-2 to perform an action relating to resources associated with, or to be associated with, the one or more than one VNF in response to that determination. The action can be, for example, varying the resources associated with, or to be associated with, the one or more than one VNF 102-1 to 102-5. The variation can comprise at least one or more than one of an increase or decrease in the resources associated with, or to be associated with, the one or more than one VNF.

Figure 5:
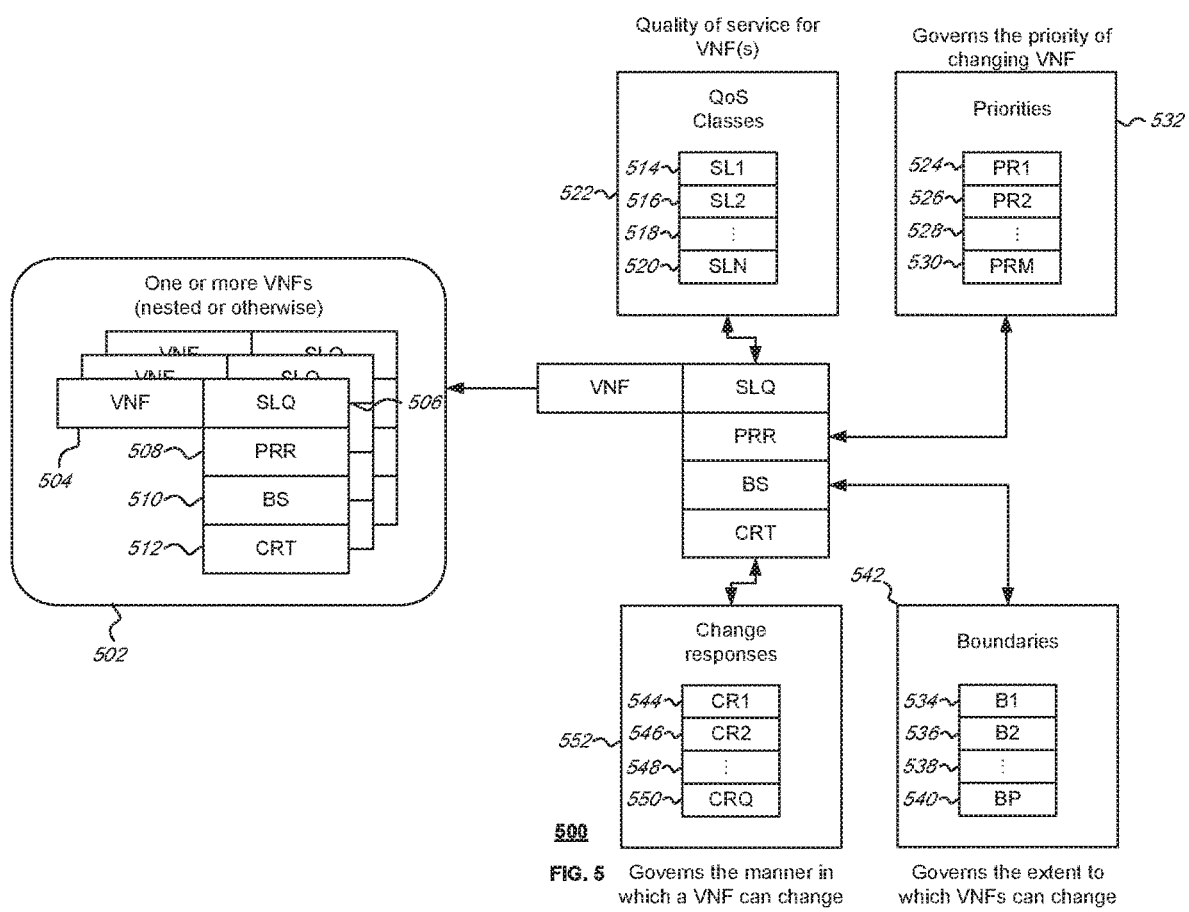
FIG. 5 illustrates machine readable storage according to example implementations.

Referring to FIG. 5, there is shown a view 500 of one or more than one data structure associated with monitoring performance data of one or more than one VNF and taking action in response to said monitoring. A first data structure 502 comprises at least one index 504 associated with a respective VNF or respective VNFs and one or more than one characteristic associated with the respective VNF or respective VNFs. The data structure 502 is an example implementation of a descriptor defining, or for controlling, at least a respective VNF. Example implementations can be realised in which the one or more than one characteristic is a characteristics that can vary, or that is associated with, performance data of the respective VNF. The QoS monitor 118, in response to processing QoS data of, or associated with, the respective VNF, selects an action based on the one or more than one characteristic as the basis for instructing the virtualisation layer 104-2. Example implementations can be realised in which a plurality of characteristics is associated with the index 504 of the respective VNF. In the example implementation shown, the index 504 of the respective VNF has four associated characteristics 506 to 512. Although the example implementation shown has four characteristics 506 to 512, implementations are not limited thereto. Example implementations can be realised in one or some other number of characteristics are associated with the index 504 of the respective VNF. The respective VNF or respective VNFs can be referred to as a VNF set.

Example implementations can be realised in which the one or more than one characteristic associated with the respective VNF can be one or more of the following taken jointly and severally in any and all permutations:

Quality of Service/Quality of Service Class 506 defining, or associated with, a target QoS for the respective VNF or respective VNFs, that is, the VNF set;

Priority 508 defining an order or sequence in which one or more than VNF in a VNF set is changed;

Boundaries 510 defining the extent to which the respective VNF or respective VNFs are allowed to change; and Change response 512 defining the manner in which the respective VNF or respective VNFs can be changed.

The Quality of Service/Quality of Service Class 506 can take a value or a class selected from a set of one or more than one possible value or class 514 to 520 as stored within a QoS data structure 522. In the example implementation depicted, N values or classes are shown.

The Priority 508 can take a value or a class selected from a set of one or more than one possible value or class 524 to 530 as stored within a Priority data structure 532. In the example implementation depicted, M values or classes are shown.

The Boundaries 510 can take a value or a class selected from a set of one or more than one possible value or class 534 to 540 as stored within a Boundaries data structure 542. In the example implementation depicted, P values or classes are shown.

The Change Response 512 can take a value or a class selected from a set of one or more than one possible value or class 544 to 550 as stored within a Change Response data structure 552. In the example implementation depicted, Q values or classes are shown.

In the foregoing, N, M, P and Q can be one or more than one. The values of N, M, P and Q can take the same value, or respective values, as any one or more than one of any of N, M, P and Q.

The QoS monitor 118, in response to assessing the performance data of the respective VNF associated with the index 504, instructs the virtualisation layer to adapt the resources associated with the respective VNF according to the at least one or more than one characteristics 506 to 512.

In the example implementation shown, the index 504 associated with a respective VNF has a Quality of Service/ Class of "SLQ", a Priority of "PRR", a Boundary of "BS" and a Change Response of "CRT". Therefore, if the VNF reports QoS data to the monitor 118 that falls outside of, or doesn't meet or otherwise correlate well, with the defined SLQ, the monitor 118 instructs the virtualisation layer to change the resources associated with the VNF in an order that respects the VNF's priority PRR relative to the priorities of other VNFs. The change response CRT defines the change in resources that is to be made in response to the determination by the monitor 118 regarding the QoS data. For example, the change response could allocate more virtual resources to the VNF such as, for example, at least one or more than one of virtual compute resources 112, virtual storage resources 114 or virtual network resources 116. The change in resources is subject to the boundary BS associated that change response CRT, that is, the amount of virtual resources additionally allocated to the VNF could be subject to one or more than one limit. For example, the allocation of virtual resources could be subject to at least one, or both, of an upper and lower limit that govern either the change in virtual resources allowed or the total or absolute amount of the virtual resources allocated to the VNF.

Allocating virtual compute resources 112 can comprise at least one of allocating processor utilization, processor time, processor clock frequency, number of processors taken jointly and severally in any and all permutations.

Allocating virtual storage resources 114 can comprise at least one of allocating an amount of storage, storage utilization, memory bus speed, memory speed taken jointly and severally in any and all permutations.

Allocating virtual network resources 116 can comprise at least one of allocating channels, bandwidth, carrier frequency taken jointly and severally in any and all permutations.

Example implementations can be realised in the form of machine-executable instructions arranged, when executed by a machine, to implement any or all aspects, processes, activities or flowcharts, taken jointly and severally in any and all permutations, described in this application. It will be appreciated that circuitry as used herein can comprise one or more than one of physical electronic circuitry, software, hardware, application specific integrated circuitry or FPGAs, taken jointly or severally in any and all permutations.

Therefore, implementations also provide machine-readable storage storing such machine-executable instructions. The machine-readable storage can comprise transitory or non-transitory machine-readable storage. The machine can comprise one or more processors, or other circuitry, for executing the instructions or implementing the instructions.

Figure 6:
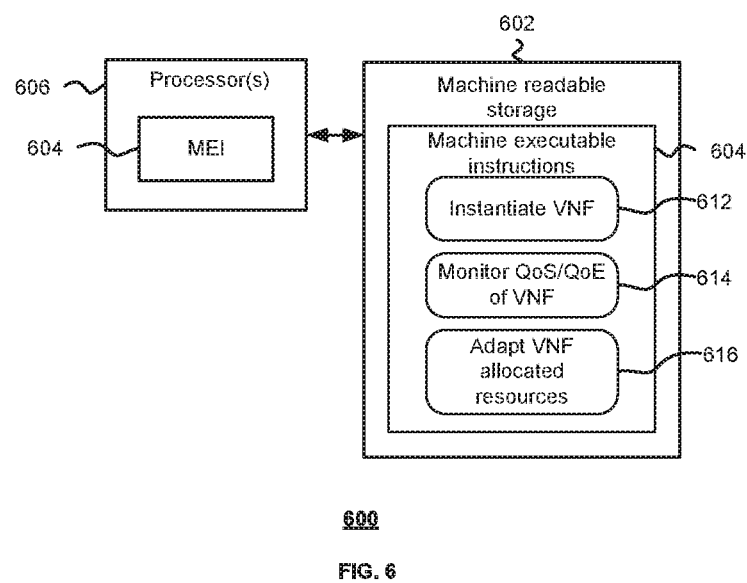
FIG. 6 depicts machine-readable storage storing machine-executable instructions according to example implementations.

Accordingly, referring to FIG. 6, there is shown a view 600 of implementations of at least one of machine-executable instructions or machine-readable storage. FIG. 6 shows machine-readable storage 602. The machine-readable storage 602 can be realised using any type of volatile or non-volatile storage such as, for example, memory, a ROM, RAM, EEPROM, or other electrical storage, or magnetic or optical storage or the like. The machine-readable storage 602 can be transitory or non-transitory. The machine-readable storage 602 stores machine-executable instructions (MEIs) 604. The MEIs 604 comprise instructions that are executable by a processor or other instruction execution, or instruction implementation, circuitry 606. The processor or other circuitry 606 is responsive to executing or implementing the MEIs 604 to perform any and all activities, processes, operations or methods described, illustrated and/or claimed in this application. Example implementations of the MEIs 604 comprise machine-executable instructions 608 for implementing the flowchart of FIG. 4. Example implementations provide MEIs 604 comprising MIEs 612 for instantiating or provisioning one or more than one VNF, MEIs 614 for monitoring performance data such as, for example, QoS data, of the one or more than one VNF and MEIs 616 for adapting resources associated with the one or more than one VNF in response to the performance data.

Example implementations can be realised according to the following clauses:

Clause 1: A method to adapt at least one performance metric associated with a characteristic of a virtual network function; the method comprising instantiating the virtual network function, determining said at least one performance metric associated with the characteristic of the virtual network function; and adapting allocated resources supporting the virtual network function according to said monitoring.

Clause 2: The method of clause 1, in which said adapting comprises determining from a change control parameter the extent to which a respective changeable characteristic of the virtual network function can be changed.

Clause 3: The method of any preceding clause, comprising determining from a quality of service parameter a respective quality of service associated with a respective characteristic of the virtual network function.

Clause 4: The method of any preceding clause, in which said adapting comprises determining from boundary parameter the extent to which a resource associated with a respective boundary characteristic of the virtual network function can be varied.

Clause 5: The method of any preceding clause, comprising determining from a priority parameter a respective priority associated with a prioritizable characteristic of the virtual network function and in which said adapting is responsive to said respective priority to vary resources associated with the virtual network function.

Clause 6: The method of any preceding clause, in which the at least one performance metric associated with the characteristic of the virtual network function comprises at least one of a quality of service metric or a class of service metric.

Clause 7: The method of clause 6, in which the class of service metric is selected from a plurality of class of service metrics.

Clause 8: The method of any preceding clause, in which the change control parameter governs the extent to which one or more than one of the following respective changeable characteristics of the virtual network function can be varied: the number of virtual machines supporting the virtual network function; the amount of virtual storage supporting the virtual network function; the number of virtual computing resources supporting the virtual network function; the amount of virtual networking resources supporting the virtual network function; the amount of physical storage supporting the virtual network function; the number of physical computing resources supporting the virtual network function; the amount of physical networking resources supporting the virtual network function.

Clause 9: The method of any preceding clause, comprising varying, in response to the change control parameter, one or more than one of the following respective changeable characteristics of the virtual network function to influence the performance of the virtual network function relative to the metric associated with the characteristic of the virtual network function: the number of virtual machines supporting the virtual network function; the amount of virtual storage supporting the virtual network function; the number of virtual computing resources supporting the virtual network function; the amount of virtual networking resources supporting the virtual network function; the amount of physical storage supporting the virtual network function; the number of physical computing resources supporting the virtual network function; or the amount of physical networking resources supporting the virtual network function; wherein the foregoing are taken jointly and severally in any and all permutations.

Clause 10: A descriptor for defining at least one virtual network function, the descriptor comprising data associated with at least one performance metric of the at least one virtual network function.

Clause 11: Machine-executable instructions arranged, when executed or implemented, to implement a method of any of clauses 1 to 9.

Clause 12: Machine-readable storage storing machine-executable instructions of clause 11.

Clause 13: An apparatus to vary resources associated with a virtual network function according to at least one performance metric associated with a characteristic of the virtual network function; the apparatus circuitry to: instantiate the virtual network function, determine said at least one performance metric associated with the characteristic of the virtual network function; and adapt allocated resources supporting the virtual network function according to said monitoring.

Clause 14: The apparatus of clause 13, in which said circuitry to adapt comprises circuitry to determine from a change control parameter the extent to which a respective changeable characteristic of the virtual network function can be changed.

Clause 15: The apparatus of any of clauses 13 to 14, comprising circuitry to determine from a quality of service parameter a respective quality of service associated with a respective characteristic of the virtual network function.

Clause 16: The apparatus of any of clauses 13 to 15, in which said circuitry to adapt comprises circuitry to determine from boundary parameter the extent to which a resource associated with a respective boundary characteristic of the virtual network function can be varied.

Clause 17: The apparatus of any of clauses 13 to 16, comprising circuitry to determine from a priority parameter a respective priority associated with a prioritizable characteristic of the virtual network function and in which said circuitry to adapt is responsive to said respective priority to vary resources associated with the virtual network function.

Clause 18: The apparatus of any of clauses 13 to 17, in which the at least one performance metric associated with the characteristic of the virtual network function comprises at least one of a quality of service metric or a class of service metric.

Clause 19: The apparatus of clause 18, in which the class of service metric is selected from a plurality of class of service metrics.

Clause 20: The apparatus of any preceding clause, in which the change control parameter governs the extent to which one or more than one of the following respective changeable characteristics of the virtual network function can be varied: the number of virtual machines supporting the virtual network function; the amount of virtual storage supporting the virtual network function; the number of virtual computing resources supporting the virtual network function; the amount of virtual networking resources supporting the virtual network function; the amount of physical storage supporting the virtual network function; the number of physical computing resources supporting the virtual network function; the amount of physical networking resources supporting the virtual network function.

Clause 21: The apparatus of any of clauses 13 to 20, comprising circuitry to vary, in response to the change control parameter, one or more than one of the following respective changeable characteristics of the virtual network function to influence the performance of the virtual network function relative to the metric associated with the characteristic of the virtual network function: the number of virtual machines supporting the virtual network function; the amount of virtual storage supporting the virtual network function; the number of virtual computing resources supporting the virtual network function; the amount of virtual networking resources supporting the virtual network function; the amount of physical storage supporting the virtual network function; the number of physical computing resources supporting the virtual network function; or the amount of physical networking resources supporting the virtual network function; wherein the foregoing are taken jointly and severally in any and all permutations.

The invention claimed is:

1. A method to adapt resources associated with network function virtualization in a network; the method comprising:
    instantiating the network function virtualization for facilitating a virtual network function (VNF);
    monitoring the VNF to determine one or more performance metrics indicating performance of allocated resources supporting the VNF; and
    adapting the allocated resources supporting the VNF according to the one or more performance metrics from the monitoring within a boundary indicating an extent to which the VNF is allowed to change;
    wherein the network function virtualization is based on a combination of the VNF, a network function virtualization infrastructure (NFVI), and a network function virtualization management and orchestration entity, and wherein the VNF is a virtualized function of the network capable of executing on the NFVI.

2. The method of claim 1, wherein adapting the allocated resources comprises determining a change control parameter that indicates the extent to which a respective changeable characteristic of the VNF can be changed.

3. The method of claim 1, further comprising determining a quality of service parameter that indicates a quality of service associated with a respective characteristic of the VNF.

4. The method of claim 1, wherein adapting the allocated resources comprises determining a boundary parameter that indicates the extent to which a resource associated with the VNF can be varied.

5. The method of claim 1, further comprising determining a priority parameter that indicates a priority associated with a prioritizable characteristic of the VNF, and wherein adapting the allocated resources comprises varying resources associated with the VNF based on the priority.

6. The method of claim 1, wherein the one or more performance metrics comprises one or more of: a quality of service metric and a class of service metric.

7. The method of claim 6, wherein the class of service metric is selected from a plurality of class of service metrics.

8. The method of claim 1, wherein the boundary indicates one or more of the following changeable characteristics of the VNF:
    a number of virtual machines supporting the VNF;
    an amount of virtual storage supporting the VNF;
    a number of virtual computing resources supporting the VNF;
    an amount of virtual networking resources supporting the VNF;
    an amount of physical storage supporting the VNF;
    a number of physical computing resources supporting the VNF;
    an amount of physical networking resources supporting the VNF.

9. An apparatus to adapt resources associated with network function virtualization in a network; the apparatus comprising:
    a processor;
    a non-transitory computer-readable storage medium storing instructions, which when executed by the processor causes the processor to perform a method, the method comprising:
    instantiating the network function virtualization for facilitating a virtual network function (VNF);
    monitoring the VNF to determine one or more performance metrics indicating performance of allocated resources supporting the VNF; and
    adapting the allocated resources supporting the VNF according to the one or more performance metrics from the monitoring within a boundary indicating an extent to which the VNF is allowed to change;
    wherein the network function virtualization is based on a combination of the VNF, a network function virtualization infrastructure (NFVI), and a network function virtualization management and orchestration entity, and wherein the VNF is a virtualized function of the network capable of executing on the NFVI.

10. The apparatus of claim 9, wherein adapting the allocated resources comprises determining a change control parameter that indicates the extent to which a respective changeable characteristic of the VNF can be changed.

11. The apparatus of claim 9, wherein the method further comprises determining a quality of service parameter that indicates a quality of service associated with a respective characteristic of the VNF.

12. The apparatus of claim 9, wherein adapting the allocated resources comprises determining a boundary parameter that indicates the extent to which a resource associated with the VNF can be varied.

13. The apparatus of claim 9, wherein the method further comprises determining a priority parameter that indicates a priority associated with a prioritizable characteristic of the VNF, and wherein adapting the allocated resources comprises varying resources associated with the VNF.

14. The apparatus of claim 9, wherein the one or more performance metrics comprises one or more of: a quality of service metric and a class of service metric.

15. The apparatus of claim 14, wherein the class of service metric is selected from a plurality of class of service metrics.

16. The apparatus of claim 9, wherein the boundary indicates one or more of the following changeable characteristics of the VNF:
 a number of virtual machines supporting the VNF;
 an amount of virtual storage supporting the VNF;
 a number of virtual computing resources supporting the VNF;
 an amount of virtual networking resources supporting the VNF;
 an amount of physical storage supporting the VNF;
 a number of physical computing resources supporting the VNF;
 an amount of physical networking resources supporting the VNF.

17. A non-transitory computer-readable storage medium storing instructions that when executed by a computing system cause the computing system to perform a method, the method comprising:
 instantiating the network function virtualization for facilitating a virtual network function (VNF);
 monitoring the VNF to determine one or more performance metrics indicating performance of allocated resources supporting the VNF; and
 adapting the allocated resources supporting the VNF according to the one or more performance metrics from the monitoring within a boundary indicating an extent to which the VNF is allowed to change;
 wherein the network function virtualization is based on a combination of the VNF, a network function virtualization infrastructure (NFVI), and a network function virtualization management and orchestration entity, and wherein the VNF is a virtualized function of the network capable of executing on the NFVI.

18. The non-transitory computer-readable storage medium of claim 17, wherein adapting the allocated resources comprises determining a change control parameter that indicates the extent to which a respective changeable characteristic of the VNF can be changed.

19. The non-transitory computer-readable storage medium of claim 17, wherein the method further comprises determining a quality of service parameter that indicates a quality of service associated with a respective characteristic of the VNF.

20. The non-transitory computer-readable storage medium of claim 17, wherein the method further comprises determining a priority parameter that indicates a priority associated with a prioritizable characteristic of the VNF, and wherein adapting the allocated resources comprises varying resources associated with the VNF.

\* \* \* \* \*